(12) United States Patent
Biesse

(10) Patent No.: US 7,366,633 B2
(45) Date of Patent: Apr. 29, 2008

(54) SIGNAL PROCESSING METHODS

(75) Inventor: Frédéric Biesse, Monteignet sur l'Andelot (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 40 days.

(21) Appl. No.: 10/578,539

(22) PCT Filed: Oct. 25, 2004

(86) PCT No.: PCT/EP2004/012025

§ 371 (c)(1),
(2), (4) Date: May 4, 2006

(87) PCT Pub. No.: WO2005/044651

PCT Pub. Date: May 19, 2005

(65) Prior Publication Data
US 2007/0078583 A1    Apr. 5, 2007

(30) Foreign Application Priority Data
Nov. 5, 2003  (FR) .................................. 03 13078

(51) Int. Cl.
*G01P 3/00* (2006.01)
*G06F 15/00* (2006.01)
(52) U.S. Cl. ...................... 702/145; 702/189; 702/196

(58) Field of Classification Search ................. 702/75, 702/96, 142, 145, 189, 191, 196; 701/82, 701/214; 342/95, 96
See application file for complete search history.

(56) References Cited

U.S. PATENT DOCUMENTS

| | | | |
|---|---|---|---|
| 4,764,871 A | 8/1988 | Van Zanten | |
| 5,913,240 A | 6/1999 | Drähne et al. | |
| 6,293,140 B1 | 9/2001 | Lohberg | |
| 2002/0024331 A1* | 2/2002 | Lewis et al. | .................. 324/96 |
| 2003/0060945 A1* | 3/2003 | Varon | ............................ 701/4 |
| 2003/0164036 A1 | 9/2003 | Giustino et al. | |

\* cited by examiner

*Primary Examiner*—Bryan Bui
(74) *Attorney, Agent, or Firm*—Cohen Pontani Lieberman & Pavane LLP

(57) ABSTRACT

A process for extracting at least one variable associated with a periodic signal (S, S') including a possible continuous component, a sinusoidal fundamental component and possible harmonics. Numerical samples of the periodic signal (S, S') are formed and special filtering is applied to monitoring of the periodic signal. Each sample is interpreted as the sum of the fundamental component and the possible continuous component of this periodic signal. This process can be applied to evaluation of the torsion of a sidewall (11) of a tire (1) fitted on a wheel under the action of torque exerted between the rim (4) of this wheel and the tread (12) of the tire (1).

12 Claims, 2 Drawing Sheets

SIGNAL PROCESSING METHODS

RELATED APPLICATIONS

This is a U.S. National Phase Application under 35 USC 371 of International Application PCT/EP2004/012025, filed on 25 Oct. 2004.

FIELD OF THE INVENTION

The invention relates to signal processing methods.

More precisely, the invention relates to a process for monitoring the rotation of a body revolving around an axis of rotation and having, over its periphery, at least a first circular track centered on the axis of rotation and consisting of marks spaced regularly from one another, in which each track of marks is associated with a sensor which is stationary relative to the revolving body, disposed facing said track and influenced by the marks of said track which travel past it and producing, as an output signal, a corresponding periodic signal, in which extraction is performed of at least one variable, such as an amplitude between extrema, a fundamental frequency, a phase, or a continuous background constant amplitude, associated with a periodic signal having a frequency at most equal to a predetermined maximum frequency and including a possible continuous component, a fundamental sinusoidal component and possible harmonics.

BACKGROUND OF THE INVENTION

In conventional methods, the most widespread process for analyzing a periodic signal and extracting from it the principal characteristic variables is based primarily on detecting passages of this signal through zero.

Knowledge of the fundamental frequency of the periodic signal, acquired by chronometrical study of instants of passage to zero, then allows gradual deduction of the other principal characteristic variables of this signal.

Such an approach is nevertheless not very effective in the event of the frequency of the periodic signal in question reaching low values, the extension of the time interval between two successive passages to zero of this signal resulting in possibly unacceptable extension of the analysis time.

Mention may be made of for example U.S. Pat. No. 4,764,871, which proposes use of a Kalman filter to estimate the wheel speed. The Applicant has noted that said method is unfortunately rather greedy with regard to calculation time.

SUMMARY OF THE INVENTION

One object of the invention, which falls within this context, is in particular to provide a process for extracting at least one characteristic variable from a periodic signal, which exhibits a clear improvement relative to the prior art.

This and other objects are attained in accordance with one aspect of the present invention directed to a process that includes: a preliminary operation for establishing a dynamic system model defined by an instantaneous state vector with a plurality of components and by a state transition matrix; an iterative measuring operation for producing, at a frequency at least equal to twice the predetermined maximum frequency, numerical samples of which each one is representative of the measured instantaneous amplitude of the periodic signal; an iterative predicting operation for calculating a predicted instantaneous amplitude of the periodic signal at each current instant by applying the transition matrix to the state vector associated with an instant preceding the current instant, resulting in a predicted state vector for the current instant, then by applying to the predicted state vector an observation matrix interpreting the measured instantaneous amplitude of the periodic signal as an at least partial manifestation of the instantaneous state vector of the dynamic system; an iterative correcting operation, for quantifying a difference between the measured amplitude and the predicted amplitude of the periodic signal at the current instant; an iterative updating operation, for updating the instantaneous state vector of the system, associated with the current instant, as a function of the quantified difference and of the state vector of the system which is associated with the instant preceding the current instant; and an iterative result-presenting operation, for deducing at each instant said variable of one at least of the components of the instantaneous state vector associated with said instant.

The instantaneous state vector comprises a component representative of the instantaneous amplitude of the fundamental component of the periodic signal, a component representative of the instantaneous amplitude of the fundamental component of the periodic signal out of phase by 90 degrees, a component representative of the amplitude of the continuous component, and a component representative of the pulsation or the frequency of the fundamental component.

Where the periodic signal comprises, among several possible harmonics, a minimum-order harmonic, the process of the invention is particularly applicable when the amplitude between extrema of the minimum-order harmonic is at least equal to a tenth of the amplitude between extrema of the fundamental component.

The process of the invention is applicable in particular to monitoring or analysis of the rotation of a body revolving around an axis of rotation and having, over its periphery, at least a first circular track centered on the axis of rotation and consisting of marks spaced regularly from one another, each track of marks being associated, in this application, with a sensor which is stationary relative to the revolving body, disposed facing said track and influenced by the marks of said track which travel past it and producing, as an output signal, a corresponding periodic signal.

The process of the invention is, therefore, particularly well suited to instances where the revolving body is a tire mounted on a wheel rim of a vehicle, where a sidewall of said tire bears at least two tracks of marks, the first of which is relatively close to the rim and the second of which is relatively close to a tread of the tire, and where the first and second tracks have the same number of marks and are associated with respective first and second sensors supplying respective first and second periodic signals, monitoring of rotation of the tire including at least determination of a phase difference between the first and second periodic signals.

Each mark preferably consists of local magnetization of the sidewall of the tire, each periodic signal thus being very close to a pure sinusoid.

When the process of the invention is applied to monitoring or analysis of rotation of the tire, this monitoring or this analysis may include evaluation of a deformation of the sidewall of the tire, resulting from the application of a torque between the rim and the tread, and expressed by a variation in the phase difference between the first and second periodic signals.

The process of the invention is thus particularly well suited to implementation of a method described for example in patent U.S. Pat. No. 5,913,240 and known by the acronym "SWT", from the English phrase "Side Wall Torsion", referring to evaluation of the torsion of the sidewall of the tire under the action of the above-mentioned torque.

BRIEF DESCRIPTION OF THE DRAWINGS

Other features and advantages of the invention will be revealed clearly by the description given thereof below, by way of non-limiting example, with reference to the appended drawings, in which.

DETAILED DESCRIPTION OF THE DRAWINGS

As indicated above, the invention relates in particular to a process for analyzing a periodic signal S including a possible continuous component So, a fundamental sinusoidal component S1 and possible harmonics Sn, and more precisely for extracting at least one variable from this signal, such as its amplitude between extrema, its fundamental frequency, its phase relative to a reference periodic signal, or the amplitude of its continuous component.

In other words, the analyzed signal S is written as follows:

$$S = So + S1 + \sum_{n=2}^{\infty}(Sn)$$

in which expression:

So is a constant, at least on an observation time scale which is relatively short with regard to a sampling period, So possibly being zero, $S1 = a_1.\sin(\omega.t+\phi)$, where $a_1$ is the half-amplitude between extrema of the fundamental component S1, where $\omega$ is the pulsation of the fundamental component S1, where t represents the time, and where $\phi$ represents the phase of the fundamental component S1 relative to a predetermined time base, for example given by a pulsation reference signal $\omega$, and $Sn = a_n.\sin(n.\omega.t+\phi_n)$, where $a_n$ is the half-amplitude, possibly zero, between extrema of the harmonic Sn of the order n, where n.$\omega$ is the pulsation of said harmonic Sn, and where $\phi_n$ represents the phase of said same harmonic Sn relative to a predetermined time base.

In practice, the process of the invention preferably applies to a periodic signal S whose minimum-order harmonic other than zero, that is to say that for which the order n assumes the smallest value ninf, exhibits a limited relative amplitude.

More precisely, the process of the invention preferably applies to a periodic signal S whose harmonic Sninf other than zero of minimum order ninf has an amplitude between extrema $2.a_{ninf}$ at most equal to a tenth of the amplitude between extrema $2.a_1$ of the fundamental component S1, in other words which satisfies the inequality:

$a_1 \geq 10.a_{ninf}$

Schematically, the process of the invention consists in applying special filtering to monitoring of the periodic signal S, modeled as the sum of its fundamental component S1 and its possible continuous component So, instead of the Kalman filtering proposed in the prior art.

Figure 1:
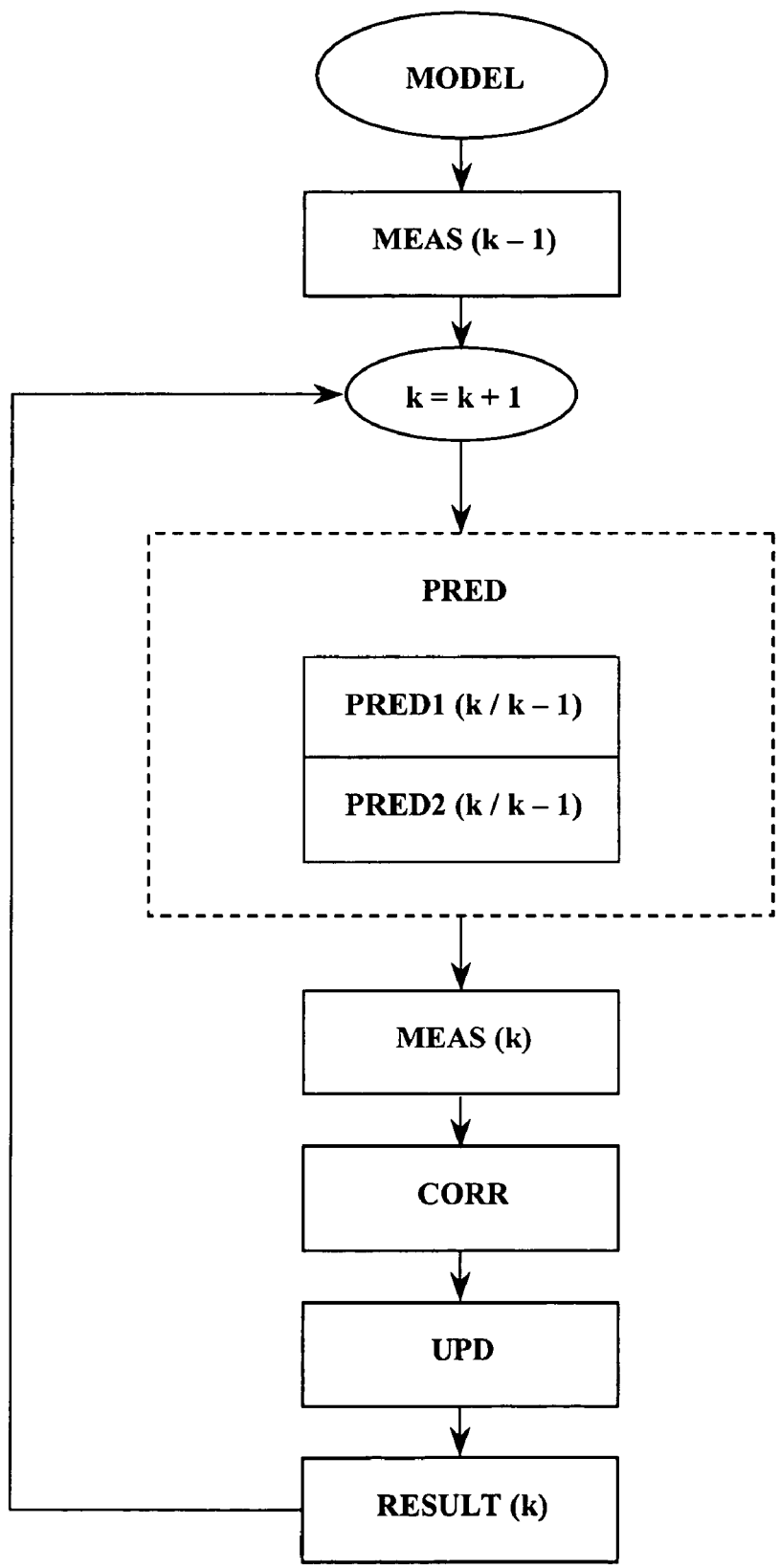
FIG. 1 is a flowchart for implementing the process of the invention.

This process, whose operations are illustrated in FIG. 1, comprises first of all a preliminary modeling operation MODEL, which consists in establishing a dynamic system model defined by an instantaneous state vector with a plurality of components and by a state transition matrix.

As indicated above, the periodic signal is modeled as the sum of So and S1, such that the instantaneous state vector $\hat{x}$ assumes the following form, for example:

$$\hat{x} = \begin{bmatrix} \hat{x}_p \\ \hat{x}_q \\ \hat{x}_c \\ \hat{\omega} \end{bmatrix}$$

in which:

the component $\hat{x}_p$ is representative of the instantaneous amplitude of the fundamental component S1 of the periodic signal S, that is to say $a_1.\sin(\omega.t+\phi)$ at the instant t in question, the component $\hat{x}_q$ is representative of the instantaneous amplitude of the fundamental component S1 of the periodic signal out of phase by 90 degrees, that is to say $a_1.\cos(\omega.t+\phi)$ at the instant t in question, the component $\hat{x}_c$ is representative of the amplitude of the continuous component So, and the component $\hat{\omega}$ is representative of the pulsation of the fundamental component S1, which is linked to the frequency F of this component by the formula $F = \hat{\omega}/2\pi$.

The state transition matrix A is defined by:

$$A = \begin{bmatrix} \cos(\hat{\omega}T_e) & -\sin(\hat{\omega}T_e) & 0 & 0 \\ \sin(\hat{\omega}T_e) & \cos(\hat{\omega}T_e) & 0 & 0 \\ 0 & 0 & 1 & 0 \\ 0 & 0 & 0 & 1 \end{bmatrix}$$

where $T_e$ represents a sampling period, that is to say the reciprocal of a sampling frequency $f_e$, said sampling frequency $f_e$ being at least equal to twice the maximum frequency $f_{max}$ of the periodic signal S.

The process of the invention further comprises an iterative measuring operation MEAS, which consists in producing, at the sampling frequency $f_e$, numerical samples $y_k$, each of which is representative of the measured instantaneous amplitude of the periodic signal S.

Instead of treating the time t as a continuous variable, the sampling operation leads to considering only the instants of the form $t = k.T_e$ at which a numerical sample is produced, k being an integer which, by convention, will be considered as identifying a current instant.

As FIG. 1 shows, a first measurement is performed at an instant k−1 prior to an iterative process, thus making available an initial sample $y_{k-1}$.

Within the iterative process, the process of the invention comprises an iterative predicting operation PREDIC consisting in calculating a predicted instantaneous amplitude $\hat{y}_{k/k-1}$ for the periodic signal S at each instant k, and itself comprising two elementary operations respectively designated PREDIC1 and PREDIC2.

The elementary operation PREDIC1 consists in calculating a prediction $\hat{x}_{k/k-1}$ for the instantaneous state vector $\hat{x}$ for the current instant k, by applying the transition matrix A to the state vector $\hat{x}_{k-1/k-1}$ associated with the instant k−1 preceding the current instant k, that is to say by performing the calculation:

$$\hat{x}_{k/k-1} = A \times \hat{x}_{k-1/k-1}$$

The elementary operation PREDIC2 consists in calculating the predicted instantaneous amplitude $\hat{y}_{k/k-1}$ of the periodic signal S for the current instant k by applying to the prediction $\hat{x}_{k/k-1}$ of the instantaneous state vector $\hat{x}$ for the current instant k an observation matrix C, that is to say by performing the calculation:

$$\hat{y}_{k/k-1} = C \times \hat{x}_{k/k-1}$$

The observation matrix, which assumes the value:

$$C = [1\ 0\ 1\ 0]$$

simply expresses the fact that each measured sample $y_k$ has as its amplitude only the sum of the amplitudes of the first and third components $\hat{x}_p$ and $\hat{x}_c$ of the instantaneous state vector $\hat{x}$, the observation matrix C thus interpreting the measured instantaneous amplitude $y_k$ of the periodic signal S as a partial manifestation of the instantaneous state vector of the dynamic system.

After obtaining, by means of the iterative measuring operation MEAS, a numerical sample $y_k$ representative of the instantaneous amplitude of the periodic signal S at the current instant k, the process executes an iterative correcting operation CORR, which consists in quantifying the difference $v_k$ between the measured amplitude $y_k$ and the predicted amplitude $\hat{y}_{k/k-1}$ of the periodic signal at the current instant k, that is to say in performing the calculation:

$$v_k = y_k - \hat{y}_{k/k-1}$$

The process then comprises an iterative updating operation UPD, which consists in updating the instantaneous state vector $\hat{x}_{k/k}$ of the system, associated with the current instant k, as a function of the quantified difference $v_k$ and of the state vector $\hat{x}_{k/k-1}$ of the system which is associated with the instant k−1 preceding the current instant k.

More precisely, the iterative updating operation UPD is implemented by performing the calculation:

$$\hat{x}_{k/k} = \hat{x}_{k/k-1} + K \times v_k,$$

where K is a gain factor given by the expression:

$$K = \left[ \frac{2}{T_0}\ \ 0\ \ \frac{2}{T_0}\ \ -\frac{2\hat{x}_{qk} \times v_k}{T_0 T_f (\hat{x}_{pk}^2 + \hat{x}_{qk}^2)} \right] \times \frac{1}{f_e}$$

in which $T_0$ is the response time of the filter, expressed in seconds, for estimating the amplitude of the periodic signal S, $T_f$ is the response time of the filter, expressed in seconds, for estimating the frequency of the periodic signal S, and $f_e$ is the sampling frequency, the variables $T_0$ and $T_f$ being capable of being determined experimentally and being the subject of optimization by trial and error.

Finally, the process of the invention comprises an iterative result-presenting operation RESULT, which consists in using one or more of the components $\hat{x}_p$, $\hat{x}_q$, $\hat{x}_c$, $\hat{\omega}$ of the instantaneous state vector $\hat{x}_{k/k}$ associated with the current instant k to deduce therefrom the value assumed, at said instant k, by a characteristic variable of the periodic signal S.

The details of this latter operation, which uses the fundamental trigonometrical relationships well known to the person skilled in the art, vary according to the nature of the variable sought.

If, for example, it is simply a matter of extracting the fundamental frequency F from the periodic signal S, the operation RESULT will consist in performing the calculation:

$$F = \hat{\omega}/2\pi.$$

If it is a matter of extracting the amplitude B between extrema from the fundamental component S1, the operation RESULT will consist in performing the calculation:

$$B = 2 \times \sqrt{\hat{x}_p^2 + \hat{x}_q^2},$$

the person skilled in the art being in a position, on the basis of the above description and of his/her general knowledge, to apply the trigonometric formula appropriate to the variable sought.

Once the operation RESULT has been performed, the iterative process is looped, with incrementation by one unit of the current instant k.

The process of the invention is applicable to the monitoring or analysis of the rotation of a body 1 revolving around an axis of rotation H, for example of a tire 1 (FIG. 3) fitted on the wheel of a vehicle, or of a coding wheel (not shown) connected rotationally to the wheel of the vehicle.

In this case, the revolving body 1 whose rotation is monitored bears, over its periphery, one or more circular tracks such as P and P', centered on the axis of rotation H and each consisting of marks, such as 2 and 2', spaced regularly from one another.

Each track P and P' is associated with a sensor such as 3 and 3', stationary relative to the revolving body 1, disposed facing said track and influenced by the marks 2 of said track which travel past it and producing, as an output signal, a corresponding periodic signal, such as S and S'.

Figure 2:
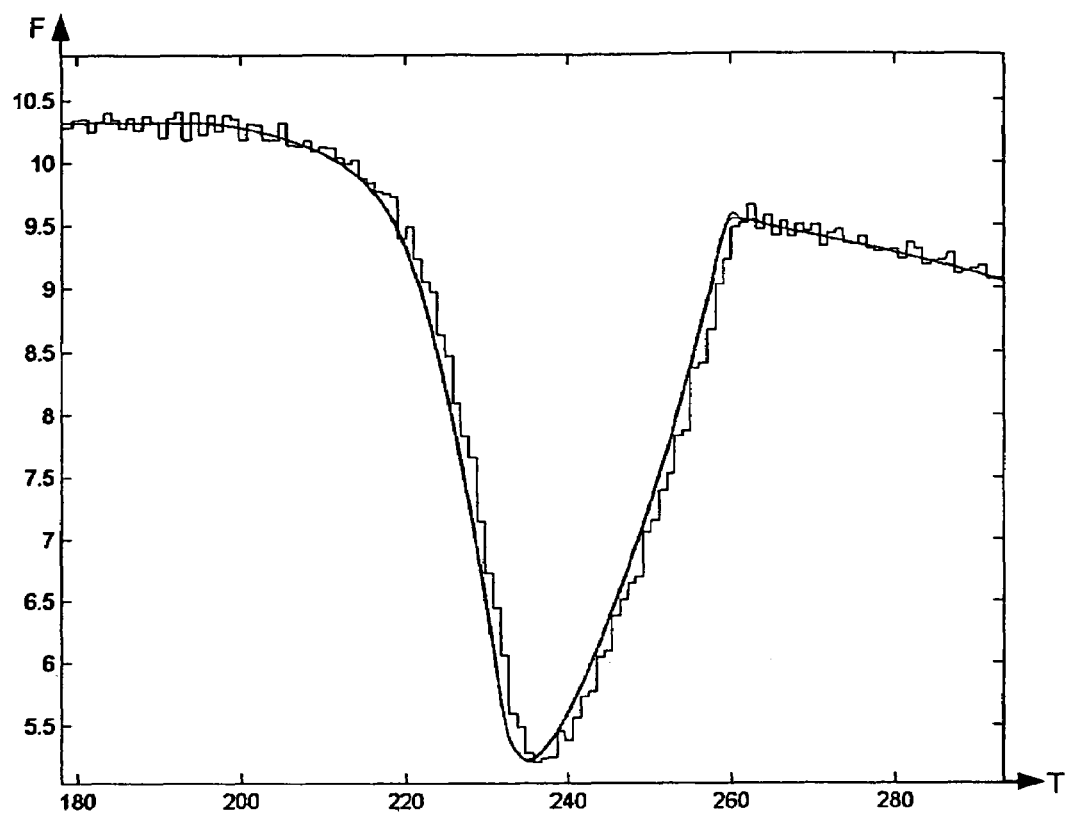
FIG. 2 is a diagram representing, as a function of the time T, the angular speed of rotation of a wheel during braking followed by release.

FIG. 2 illustrates, by the square-wave graph, the shape of a signal originating, conventionally, from a wheel rotation sensor of a motor vehicle, using an ABS (antilock brake system) coding wheel, in the case where the wheel is braked and then released.

During the time t, the frequency F of rotation of the wheel of the vehicle falls during braking to a situation close to locking, then increases again when the wheel is released.

FIG. 2 shows, in addition to the square-wave graph, two continuous curve graphs so close to one another as to be in fact indistinguishable from one another.

One of these continuous curve graphs represents the true frequency of rotation of the wheel of the vehicle under the above-described conditions, and the other of these continuous curve graphs represents the frequency of rotation of the wheel of the vehicle, as reconstructed by implementation of the process of the invention applied to monitoring of said frequency of rotation and using a sensor supplying a pseudo-sinusoidal signal instead of a square-wave signal.

Figure 3:
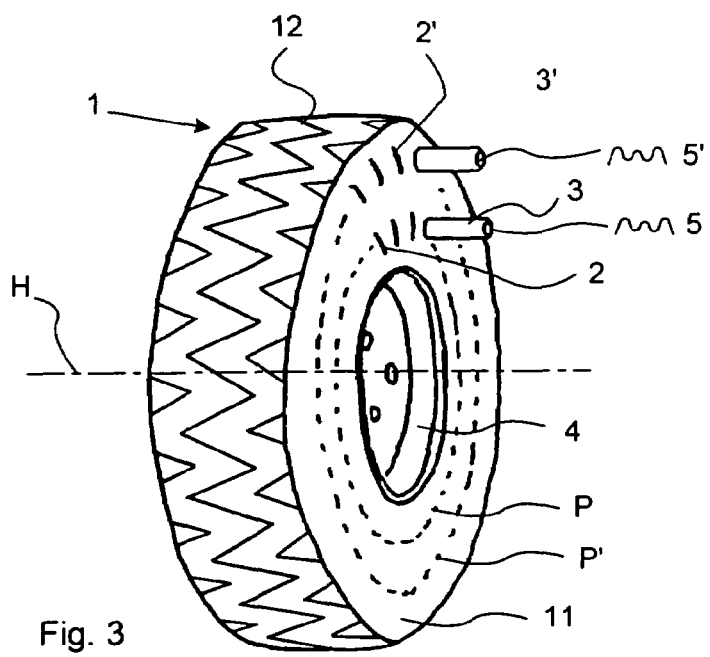
FIG. 3 is a perspective view of a wheel equipped with two tracks of magnetic marks and two sensors.

FIG. 3 illustrates a particular application of the process of the invention, in which the revolving body 1 is a tire mounted on a rim 4 fitted to the wheel of a vehicle and in which the inner sidewall 11 of this tire bears two tracks P and P' formed of respective marks 2 and 2'.

The first track P is relatively close to the rim 4, whereas the second track P' is relatively close to the tread 12 of the tire.

The tracks P and P' bear the same number of respective marks 2 and 2' and are associated with two respective sensors 3 and 3'.

Each mark such as 2 and 2' consists for example of local magnetization of the sidewall 11 of the tire 1, such that each sensor integrates, between two successive marks, the influences of these marks and supplies a corresponding periodic signal, S or S', very close to a pure sinusoid.

Under these conditions, monitoring of the rotation of the tire 1 may advantageously include determination of the phase difference $\phi$ between the periodic signals S and S', this phase difference providing information about the deformation suffered by the sidewall 11 of the tire 1 on application of a torque between the rim 4 and the tread 12, that is to say in the event of braking or acceleration of the vehicle.

In order to do this, the components $\hat{x}_p$ and $\hat{x}_p'$ of the state vectors $\hat{x}$ and $\hat{x}'$ respectively associated with S and S' are modeled as being respectively equal to $a_1.\sin(\omega.t+\phi/2)$ and to $a_1.\sin(\omega.t-\phi/2)$ at the instant t in question, after normalization of the amplitudes of S and S'.

Likewise, the components $\hat{x}_q$ and $\hat{x}_q'$ of the state vectors $\hat{x}$ and $\hat{x}'$ are modeled as being respectively equal to $a_1.\cos(\omega.t+\phi/2)$ and to $a_1.\cos(\omega.t-\phi/2)$ at the instant t in question, after normalization of the amplitudes of S and S'.

The revolving angle $\omega.t$ may thus be evaluated by the relationship:

$$\omega.t = Arctg \; [\{a_1.\sin(\omega.t+\phi/2)+a_1.\sin(\omega.t-\phi/2)\}/\{a_1.\cos(\omega.t+\phi/2)+a_1.\cos(\omega.t-\phi/2)\}]$$

the phase difference $\phi$ then being able to be evaluated by the relationship:

$$\phi = 2.[Arc \; \sin\{\sin(\omega.t+\phi/2)\}-\omega.t]$$

I claim:

1. A process for monitoring the rotation of a body revolving around an axis of rotation and having a periphery, wherein over said periphery, at least a first circular track centered on the axis of rotation comprises marks spaced regularly from one another, in which each track of said marks is associated with a sensor which is stationary relative to the revolving body and disposed facing said track and influenced by the marks of said each track which travel past said sensor and producing, as an output signal, a periodic signal, in which extraction is performed of at least one variable associated with said periodic signal having a frequency at most equal to a predetermined maximum frequency and including a possible continuous component, a sinusoidal fundamental component and possible harmonics, the process comprising the steps of:

performing a preliminary operation to establish a dynamic system model defined by an instantaneous state vector having a plurality of components and by a state transition matrix, a first of said plural components being representative of an instantaneous amplitude of the sinusoidal fundamental component of the periodic signal, a second of said plural components being representative of the instantaneous amplitude of the sinusoidal fundamental component of the periodic signal out of phase by 90 degrees, a third of said plural components being representative of the amplitude of the continuous component, and a fourth of said plural components being representative of a pulsation or frequency of the fundamental component;

performing an iterative measurement to produce, at a frequency at least equal to twice the predetermined maximum frequency, numerical samples each of which is representative of the measured instantaneous amplitude of the periodic signal;

performing an iterative prediction to calculate a predicted instantaneous amplitude of the periodic signal at each current instant by applying the state transition matrix to the state vector associated with an instant preceding the current instant, said prediction resulting in a predicted state vector for the current instant, and by applying to the predicted state vector an observation matrix interpreting the measured instantaneous amplitude of the periodic signal as an at least partial manifestation of the instantaneous state vector of the dynamic system;

performing an iterative correction to quantify a difference between the measured instantaneous amplitude and the predicted instantaneous amplitude of the periodic signal at the current instant;

performing an iterative update of the instantaneous state vector of the dynamic system, associated with the current instant, as a function of the quantified difference and the predicted state vector of the dynamic system which is associated with the instant preceding the current instant; and performing an iterative presentation of a result to deduce at each instant said at least one variable of at least one of said plural components of the instantaneous state vector associated with said instant.

2. The process according to claim 1, wherein the periodic signal comprises, among several possible harmonics, a minimum-order harmonic, and wherein the amplitude between extrema of the minimum-order harmonic is at least equal to a tenth of the amplitude between extrema of the sinusoidal fundamental component.

3. The process according to claim 2, wherein the revolving body is a tire mounted on a wheel rim of a vehicle, wherein a sidewall of said tire bears at least two tracks of marks a first mark of which is relatively close to the wheel rim and a second mark of which is relatively close to a tread of the tire, and wherein the first and second tracks have an identical number of marks and are associated with respective first and second sensors supplying respective first and second periodic signals, monitoring rotation of the tire including at least determination of a phase difference between the first and second periodic signals.

4. The process according to claim 3, wherein each said mark includes local magnetisation of a sidewall of the tire.

5. The process according to claim 4, wherein monitoring or analysis of the rotation of the tire includes evaluation of a deformation of the sidewall of the tire, resulting from application of a torque between the wheel rim and the tread of the tire and expressed as a variation in the phase difference between the first and second periodic signals.

6. The process according to claim 3, wherein monitoring or analysis of the rotation of the tire includes evaluation of a deformation of the sidewall of the tire, resulting from application of a torque between the wheel rim and the tread of the tire and expressed as a variation in the phase difference between the first and second periodic signals.

7. The process according to claim 1, wherein the revolving body is a tire mounted on a wheel rim of a vehicle, wherein a sidewall of said tire bears at least two tracks of marks, a first mark of which is relatively close to the wheel rim and a second mark of which is relatively close to a tread of the tire, and wherein the first and second tracks have an identical number of marks and are associated with respective first and second sensors supplying respective first and second periodic signals, monitoring rotation of the tire including at least determination of a phase difference between the first and second periodic signals.

8. The process according to claim 7, wherein each said mark includes local magnetisation of the sidewall of the tire.

9. The process according to claim 8, wherein monitoring or analysis of the rotation of the tire includes evaluation of a deformation of the sidewall of the tire, resulting from application of a torque between the wheel rim and the tread of the tire and expressed as a variation in the phase difference between the first and second periodic signals.

10. The process according to claim 7, wherein monitoring or analysis of the rotation of the tire includes evaluation of a deformation of the sidewall of the tire, resulting from application of a torque between the wheel rim and the tread of the tire and expressed as a variation in the phase difference between the first and second periodic signals.

11. The process according to claim 1, wherein the at least one variable comprises an amplitude between extrema, a fundamental frequency, a phase and a continuous background constant amplitude.

12. The process according to claim 11, wherein the amplitude between extrema is in accordance with the relationship $(2 \times \sqrt{\hat{x}_p^2 + \hat{x}_q^2})$, where $\hat{x}_p$ is the instantaneous amplitude of the fundamental component of the periodic signal, $\hat{x}_q$ is representative of the instantaneous amplitude of the fundamental component of the periodic signal out of phase by 90 degrees, $\hat{\omega}/2\pi$ is the fundamental frequency and $\hat{\omega}$ is the frequency.

\* \* \* \* \*